United States Patent
Chen et al.

(10) Patent No.: US 11,475,225 B2
(45) Date of Patent: Oct. 18, 2022

(54) METHOD, SYSTEM, ELECTRONIC DEVICE AND STORAGE MEDIUM FOR CLARIFICATION QUESTION GENERATION

(71) Applicant: National University of Defense Technology, Hunan (CN)

(72) Inventors: Honghui Chen, Hunan (CN); Taihua Shao, Hunan (CN); Fei Cai, Hunan (CN); Zhen Shu, Hunan (CN); Wanyu Chen, Hunan (CN); Jingjing Yan, Hunan (CN); Tao Chen, Hunan (CN); Aimin Luo, Hunan (CN); Mengmeng Zhang, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/698,722

(22) Filed: Mar. 18, 2022

(65) Prior Publication Data
US 2022/0300718 A1 Sep. 22, 2022

(30) Foreign Application Priority Data
Mar. 22, 2021 (CN) .......................... 202110300792.4

(51) Int. Cl.
*G06F 40/40* (2020.01)
*G06F 40/186* (2020.01)
(Continued)

(52) U.S. Cl.
CPC ............ *G06F 40/40* (2020.01); *G06F 40/186* (2020.01); *G06F 40/295* (2020.01); *G06F 40/35* (2020.01); *G06N 3/0436* (2013.01); *G06N 3/08* (2013.01)

(58) Field of Classification Search
USPC .................. 704/7–9, 202, 232, 257, 259
See application file for complete search history.

(56) References Cited

U.S. PATENT DOCUMENTS

2015/0120723 A1\* 4/2015 Deshmukh .......... G06F 16/9535
707/734
2019/0005385 A1 1/2019 Celikyilmaz et al.
(Continued)

FOREIGN PATENT DOCUMENTS

CN 110134771 A 8/2019
CN 111738006 A 10/2020
(Continued)

OTHER PUBLICATIONS

Chonghao Chen et al., "Fact Verification Method Based on Entity Graph Neural Network", Jun. 30, 2020.
(Continued)

*Primary Examiner* — Leonard Saint Cyr
(74) *Attorney, Agent, or Firm* — Dragon Sun Law Firm, PC; Jinggao Li, Esq.; Nathaniel Perkins

(57) ABSTRACT

A method, a device and electronic device for clarification question generation are provided in one or more embodiments of this disclosure. The method includes: extracting entity information from a fuzzy context input by a user; inputting the fuzzy context into a template generating module of a pre-built CQG neural network model so as to obtain a clarification question template; inputting the entity information into an entity rendering module of the CQG neural network model so as to obtain at least one entity phrase; and generating a clarification question for a fuzzy question based on the clarification question template and the at least one entity phrase for presenting to the user.

15 Claims, 6 Drawing Sheets

(51) Int. Cl.
  *G06N 3/08*   (2006.01)
  *G06F 40/35*  (2020.01)
  *G06N 3/04*   (2006.01)
  *G06F 40/295* (2020.01)

(56) References Cited

U.S. PATENT DOCUMENTS

| | | | |
|---|---|---|---|
| 2020/0026760 A1 | 1/2020 | Chiu et al. | |
| 2020/0184019 A1* | 6/2020 | Yu | G06N 3/0481 |
| 2020/0279001 A1* | 9/2020 | Prabhugaonkar | G06N 5/022 |
| 2020/0320387 A1 | 10/2020 | Ghaeini et al. | |
| 2021/0174023 A1* | 6/2021 | Gao | G06F 16/3329 |
| 2021/0191926 A1* | 6/2021 | Izenson | G06N 5/041 |

FOREIGN PATENT DOCUMENTS

| | | |
|---|---|---|
| CN | 111813913 S | 10/2020 |
| CN | 111897949 A | 11/2020 |
| CN | 111966812 A | 11/2020 |
| CN | 111984782 A | 11/2020 |

OTHER PUBLICATIONS

Yu Zhao, "Research and Implementation of Problem Generation Method Based on Deep Learning" Jul. 15, 2020.

Ruigang Fu, "Study of Weakly Supervised Object Detection Based on Convolution Neural Networks" Jan. 15, 2021.

* cited by examiner (a) BLEU.  (b) ROUGE.

METHOD, SYSTEM, ELECTRONIC DEVICE AND STORAGE MEDIUM FOR CLARIFICATION QUESTION GENERATION

This application claims priority from the Chinese patent application 202110300792.4 filed Mar. 22, 2021, the content of which are incorporated herein in the entirety by reference.

TECHNICAL FIELD

One or more embodiments of this disclosure relate to a technical field of natural language processing, in particular to a method, a device and electronic device for clarification question generation.

BACKGROUND

Clarification question generation (CQG) aims to automatically generate clarification questions to avoid misunderstanding. However, existing methods for generating clarification questions lack fuzzy semantic representation and do not deal with Out-of-Vocabulary (OOV) adequately.

SUMMARY

In view of this, one or more embodiments of this disclosure is intended to propose a method, a device and electronic device for clarification question generation to solve problems that existing methods for clarification question generation lacks fuzzy semantic representation and do not deal with Out-of-Vocabulary (OOV) adequately.

On a basis of above purposes, a method for clarification question generation is provided in one or more embodiments of this disclosure, which includes:

extracting entity information from a fuzzy context in response to receiving the fuzzy context input by a user;

inputting the fuzzy context into a template generating module of a pre-built CQG neural network model so as to obtain a clarification question template;

inputting the entity information into an entity rendering module of the CQG neural network model so as to obtain at least one entity phrase; and generating a clarification question for a fuzzy question based on the clarification question template and the at least one entity phrase for presenting to the user; wherein the CQG neural network model is constructed by adding a layered Transformer mechanism and a pointer generator mechanism into a coarse-to-fine CTF neural network model.

In some embodiments, the template generating module includes a template generating encoder and a template generating decoder.

the template generating encoder comprises a first layered Transformer encoder layer;

the template generating decoder comprises a first layered Transformer decoder layer and a first pointer generator; and inputting the fuzzy context into the template generating module so as to obtain the clarification question template includes: forming a first word embedding with a predetermined length and a predetermined dimension based on the fuzzy context;

converting, the first layered Transformer encoder layer, the first word embedding into a first layered context representation; and generating the clarification question template based on the first layered context representation by the first layered Transformer decoder layer and the first pointer generator.

In some embodiments, generating the clarification question template by the first layered Transformer decoder layer and the first pointer generator includes:

generating a first predictive output representation based on the first layered context representation and calculating a first probability of generating words from a preset vocabulary by using a softmaxfunction according to the first predictive output representation, by the first layered Transformer decoder layer;

taking the first pointer generator as a first soft switch to select to copy the first word from the fuzzy context according to an attention distribution output by a last decoder layer in the first layered Transformer decoder layer, or to generate a second word from the vocabulary according to the first final probability obtained from the first probability; and generating the clarification question template based on the first word and/or the second word.

In some embodiments, the entity rendering module includes an entity rendering encoder and an entity rendering decoder.

The entity rendering encoder includes a second layered Transformer encoder layer.

The entity rendering decoder includes a second layered Transformer decoder layer and a second pointer generator.

Inputting the entity information into the entity rendering module so as to obtain the at least one entity phrase includes:

forming a second word embedding with the predetermined length and the predetermined dimension based on the entity information;

converting, by the second layered Transformer encoder layer, the second word embedding into a second layered context representation; and generating the at least one entity phrase based on the second layered context representation by the second layered Transformer decoder layer and the second pointer generator.

In some embodiments, generating the at least one entity phrase by the second layered Transformer decoder layer and the second pointer generator includes:

generating a second predictive output representation based on the second layered context representation and calculating a second probability of generating words from the vocabulary by using a softmax function according to the second predictive output representation, by the second layered Transformer decoder layer;

taking the second pointer generator as a second soft switch to select to copy the third word from the entity information according to an attention distribution output by a last decoder layer in the second layered Transformer decoder layer, or to generate a forth word from the vocabulary according to the second final probability obtained from the second probability; and generating the at least one entity phrase based on the third word and/or the fourth word.

In some embodiments, the CQG neural network model is trained with a collaborative training paradigm, which combines an auxiliary task based on self-supervised learning with a downstream CQG task for end-to-end training.

In some embodiments, training instances are randomly sampled from a mixed training set of the auxiliary task based on self-supervised learning and the downstream CQG task to input to the CQG neural network model to train for a minimum total loss.

In some embodiments, the fuzzy context includes a historical question, a historical answer and a fuzzy question. The entity information includes an entity name, an entity type and an entity description.

The auxiliary task based on self-supervised learning includes a dialogue history prediction auxiliary task and an entity name prediction auxiliary task.

A dialog history template is generated by screening the entity name according to the fuzzy question in the dialog history prediction auxiliary task.

At least one predicted entity name is generated according to the entity type and the entity description in the entity name prediction auxiliary task.

In the dialog history prediction auxiliary task, a prediction history question and a prediction history question answer are generated according to the dialog history template and the predicted entity name, and finally a dialog history is generated according to the predicted history and the predicted history answer.

Based on a same inventive concept, a device for clarification question generation is provided in one or more embodiments of this disclosure, which includes an entity information extraction module, a clarification question template generation module, an entity phrase generation module, and a clarification question generation module.

The entity information extraction module is configured to extract entity information from a fuzzy context in response to receiving the fuzzy context including historical questions, historical answers and fuzzy questions input by a user.

The clarification question template generating module is configured to input the fuzzy context into a template generating module of a pre-built CQG neural network model so as to obtain a clarification question template.

The entity phrase generation module is configured to input the entity information into an entity rendering module of the CQG neural network model so as to obtain at least one entity phrase.

The clarification question generation module is configured to generate a clarification question for a fuzzy question based on the clarification question template and the at least one entity phrase for presenting to the user.

The CQG neural network model is constructed by adding a layered Transformer mechanism and a pointer generator mechanism into a coarse-to-fine CTF neural network model.

On a basis of the same concept, an electronic device is also provided in one or more embodiments of this disclosure, which includes a memory, a processor and a computer program stored on the memory and operable by the processor. The processor implements the method described in any one of the above embodiments when executing the computer program.

It can be seen from the above that the method, the device and the electronic device for clarification question generation are provided in one or more embodiments of this disclosure, in which the layered Transformer mechanism and the pointer generator mechanism are added to a CQG clarification question generation neural network model, and two self-supervised learning auxiliary tasks, namely the dialogue history prediction auxiliary task and the entity name prediction auxiliary task, are formulated, and the layered Transformer mechanism and the pointer generator mechanism are introduced to solve problems of insufficient processing of Out-of-Vocabulary (OOV) and lacking of fuzzy semantic representation. An end-to-end collaborative training mode is proposed to train the auxiliary task and the downstream CQG task simultaneously. Experiments performed in this disclosure on the published data set CLAQUA show that BLEU and ROUGE-L indexes are improved by 6.75% and 3.91% respectively compared with most advanced methods. And this disclosure is a first invention in which a self-supervised learning is applied to CGQ clarification question generation and to solve an OOV problem in CQG.

BRIEF DESCRIPTION OF THE DRAWINGS

In order to explain one or more embodiments of this disclosure or the technical scheme in the prior art more clearly, the drawings required in the description of the embodiments or the prior art will be briefly introduced below; obviously, the drawings in the following description are only one or more embodiments of this disclosure, and other drawings can be obtained according to these drawings by those of ordinary skill in the art without paying creative labor.

DETAILED DESCRIPTION

Figure 1:
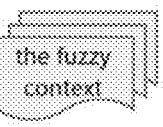
FIG. 1 is a schematic diagram of an example of CQG clarification question generation according to one or more embodiments of this disclosure.

In order to make the objects, technical schemes and advantages of the disclosure more clear, the disclosure will be further described in detail with reference to specific embodiments and drawings.

It should be noted that, unless otherwise defined, technical terms or scientific terms used in one or more embodiments of this disclosure shall have a general meaning understood by those with general skills in the field to which this disclosure pertains. Words "first", "second" and the like used in one or more embodiments of this disclosure do not indicate any order, quantity or importance, but are only used to distinguish different components. Similar words such as "including" or "containing" mean that the elements or objects appearing before the words encompass listed elements or objects appearing after the word and their equivalents, with other elements or objects being not excluded. Similar words such as "connected to" or "connected with" are not limited to physical or mechanical connection, but can include electrical connection, direct or indirect. An expression such as "upper", "lower", "left" and "right" is only used to express a relative positional relationship. When an absolute position of a described object changes, the relative positional relationship may also change accordingly.

Questioning is a basic capability of a natural language human-computer interaction system, such as a conversational information retrieval system, a conversational question-answering system and a dialogue system, etc, with a purpose to fill information gap between users and systems. As a typical task in this field, clarification question generation (CQG) is often used to deal with fuzzy and misunderstood communication scenes. Problem generation (QG) is an important research direction in a field of natural language processing, which involves text understanding and aims to generate relevant and fluent questions for a given input. It can be widely used in natural language processing applications, such as a dialogue system and a chat bot, to help the system maintain a smooth dialogue with users. Generally speaking, existing methods of the QG can be divided into two categories: rule-based QG methods and neural QG methods. Specifically, the rule-based QG methods rely heavily on manually set rules or templates to generate questions from a given text. Obviously, such a model requires experts to pre-create rules and templates in a heuristic natural language processing pipeline, which may be very time-consuming. In addition, the rule-based QG methods are difficult to generalize across fields and languages. On the contrary, the neural QG methods usually does not rely on extra manually set rules or templates. They usually follow an end-to-end trainable framework through Seq2Seq learning. However, because the question can be raised from different aspects, a conventional Seq2Seq model cannot handle such a one-to-many mapping problem in an ideal way. In order to solve this problem, it is assumed in some studies that focused aspects in generating the question are known. For example, Gao et al. take into account difficulty of the question through a difficulty estimator to enrich the conventional Seq2Seq model, and then use this model to generate questions with different difficulty levels. In addition, for different purposes, QG involves various research fields. For example, Wang et al. have designed two types of decoders for generating meaningful questions in open-domain dialogues. Kumar et al. focus on cross-language QG by using one language with abundant training instances to help another language with fewer training instances. In addition, clarification QG and visual QG is also a hot research direction of QG.

Many information needs are not clearly explained in a real scene, and clarification question generation (CQG) aims to automatically generate clarification questions to avoid misunderstanding. Because of its great commercial value, this task has attracted great attention from academia and industry. In recent years, all circles of society are trying to explore various settings of clarification questions. Generally, sorting and generating clarification questions are two main directions for clarifying ambiguous texts. For the former, Rao and Daum aim to sort a group of candidate clarification questions by maximizing expectations of potential responses to clarification questions. Aliannejadi et al. developed a retrieval framework to select clarification questions from a candidate set for an open-domain information acquisition dialogue system. In addition, Kumar et al regard sorting of clarification questions as a natural language reasoning problem, and obtain good performance by combining BERT's representation. For the latter, Rao and Daum built a model based on a Generative Confrontation Network (GAN), and generated clarification questions by estimating usefulness of potential questions. Zhang et al. aim to provide accurate recommendations by requiring users to clarify their preferences for different item attributes. Coden et al. tried to use inefficient manual rules to produce simple clarification questions. In addition, by expressing the CQG task as a Seq2Seq problem, the previous neural methods have shown impressive performance. However, existing methods lack a deep understanding of ambiguous expressions, and are plagued with the OOV problem in generating meaningful clarification questions.

Self-supervised learning is a promising research direction in unsupervised learning field. Its object is to learn general feature representations of a downstream task from a constructed auxiliary task, in which supervision signals of the auxiliary tasks are usually composed of a large-scale unsupervised data set. Since a large number of manually annotated samples are usually required to train a deep learning model, development of the self-supervised learning can provide a possible solution. For example, in a field of natural language processing, a training language model presents a kind of self-supervised learning, in which the model usually learns to predict a next word of a given previous sequence.

As mentioned in Background Section, in order to address the CQG task, a traditional rule-based CQG model is proposed to generate clarification questions from a given context, which is mainly based on manually set rules and is usually time-consuming and labor-intensive. With rapid development of natural language processing in representation learning and text generation, deep learning methods for the CQG task have been proposed. These methods mainly try to encode high-quality sentence embeddings for the fuzzy context, and then use them to decode a reasonable clarification question. However, none of them consider that a pre-trained language model is usually not applicable for tasks related to text generation. In addition, in previous methods, a single codec layer is often adopted to extract semantic features from the fuzzy context, but complex relationships between dialogue utterances cannot be captured well, without focusing on the OOV problem in CQG. That is to say, the decoder can only generate words from the preset vocabulary, but can't copy words that don't appear in the vocabulary from an input text, which are essential for a text generation task.

In a process of implementing this disclosure, the applicant found that the layered Transformer mechanism and the pointer generator mechanism are added to a CQG clarification question generation neural network model, and two self-supervised learning auxiliary tasks, namely the dialogue history prediction auxiliary task and the entity name prediction auxiliary task, are formulated, and the layered Transformer mechanism and the pointer generator mechanism are introduced to solve problems of insufficient processing of Out-of-Vocabulary (OOV) and lacking of fuzzy semantic representation. An end-to-end collaborative training mode is proposed to train the auxiliary task and the downstream CQG task simultaneously. Experiments performed in this disclosure on the published data set CLAQUA show that BLEU and ROUGE-L indexes are improved by 6.75% and 3.91% respectively compared with most advanced methods.

Figure 7:
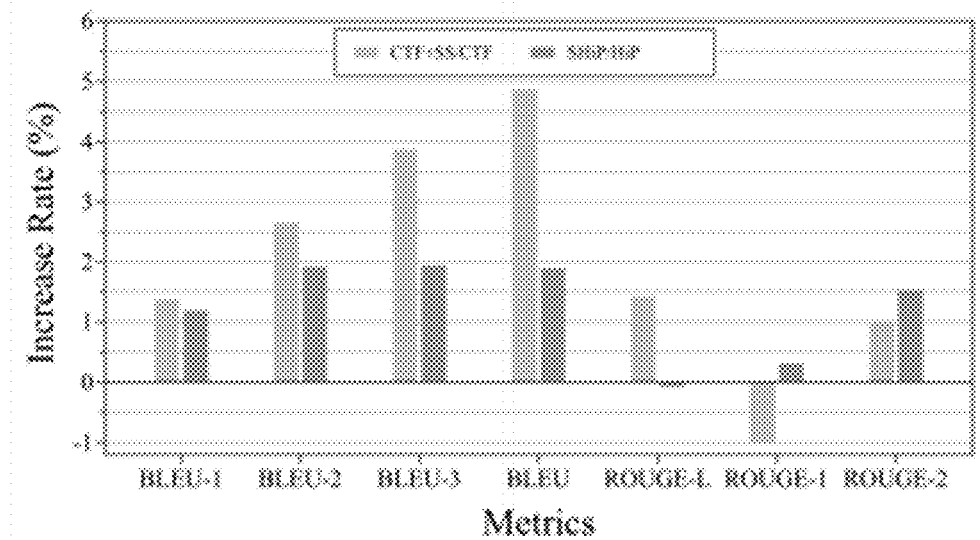
FIG. 7 is a schematic diagram of performance comparison between a model with a self-monitoring target and a model without the self-monitoring target according to one or more embodiments of this disclosure.
Figure 8:
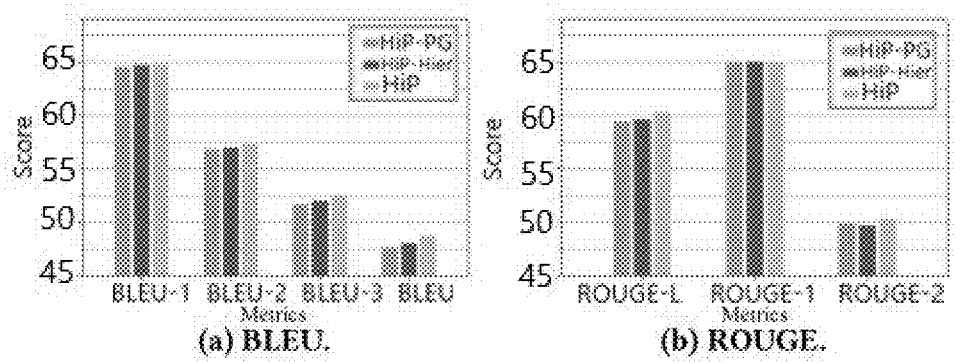
FIG. 8 is a schematic performance diagram of a model without adding a layered Transformer mechanism and a pointer generator mechanism according to one or more embodiments of this disclosure.

In the following, combined with FIG. 1 which is a schematic diagram of an example of CQG clarification question generation according to one or more embodiments of this disclosure, FIG. 2 which is a flowchart of a method for clarification question generation according to one or more embodiments of this disclosure, FIG. 3 which is a schematic diagram of a cooperative training paradigm according to one or more embodiments of this disclosure, FIG. 4 which is a schematic diagram of a CQG neural network model according to one or more embodiments of this disclosure, FIG. 5 which is a schematic diagram of a hardware structure of an electronic device according to one or more embodiments of this disclosure, FIG. 6 which is a schematic diagram of performance of the CQG neural network model under different tasks according to one or more embodiments of this disclosure, FIG. 7 which is a schematic diagram of performance comparison between a model with a self-monitoring target and a model without the self-monitoring target according to one or more embodiments of this disclosure, and FIG. 8 which is a schematic performance diagram of a model without adding a layered Transformer mechanism and a pointer generator mechanism according to one or more embodiments of this disclosure, technical schemes of this disclosure will be further explained in detail through specific embodiments.

A method for clarification question generation is provided in one or more embodiments of this disclosure, which includes S1 to S4

In S1 entity information is extracted from a fuzzy context in response to receiving the fuzzy context input by a user.

Specifically, the clarification question generation in multi-turn fuzzy dialogue environment is essential in an interactive system, such as a dialogue system, a session recommendation system and a session search system. FIG. 1 is a schematic diagram of a CQG clarification question generation example according to one or more embodiments of this disclosure, showing an example from a real-world data set CLAQUA to illustrate the CQG clarification question generation in detail. As shown, in a multi-turn dialogue, a user's question confuses a system because of its ambiguous expression, that is, "What is the name of the developer?" An entity referred to may be "Adobe Flash" mentioned above or "Robot Unicorn Attack", and in this way it is difficult for the system to give a satisfactory answer. Given information of a referred entity, it is very important to automatically generate a clarification question to make the ambiguous expression clear. Given a fuzzy context and entity information in the context, the method for clarification question generation aims to generate a reasonable clarification question to clarify the current dialogue.

In a session, the fuzzy context is expressed in this disclosure as:

$\{Q_h, R_h, Q_a\}$,

Where $Q_h$ and $R_h$ represent a historical question and answer, and $Q_a$ represents a fuzzy question that needs to be clarified. The entity information extracted from the fuzzy context is:

$\{e_1, T_1, D_1, e_2, T_2, D_2\}$,

Where e, T and D represent an entity name, an entity type and an entity description, respectively.

In this disclosure, a question finally generated to clarify the dialogue is defined as $Q_c$.

In S2, the fuzzy context is input into a template generating module of a pre-built CQG neural network model so as to obtain a clarification question template.

In this disclosure, not all of texts can be directly taken as an input, but instead a clarification question generation task is regarded as a Coarse-to-fine process, and a complex task is divided into two subtasks: a template generating task and an entity rendering task.

For the template generating task, an input is the fuzzy context $\{Q_h, R_h, Q_a\}$, and an output is a clarification question template $Q_t$. The clarification question template uses two vectors <A> and <B> to represent positions of two entity phrases, and vectors of <A> and <B> are subsequently used as an initial input of the decoder in the entity rendering task.

In some embodiments, the template generating module includes a template generating encoder and a template generating decoder.

the template generating encoder comprises a first layered Transformer encoder layer;

the template generating decoder comprises a first layered Transformer decoder layer and a first pointer generator; and inputting the fuzzy context into the template generating module so as to obtain the clarification question template includes: forming a first word embedding with a predetermined length and a predetermined dimension based on the fuzzy context;

converting, the first layered Transformer encoder layer, the first word embedding into a first layered context representation; and generating the clarification question template based on the first layered context representation by the first layered Transformer decoder layer and the first pointer generator.

In some embodiments, generating the clarification question template by the first layered Transformer decoder layer and the first pointer generator includes:

generating a first predictive output representation based on the first layered context representation and calculating a first probability of generating words from a preset vocabulary by using a softmax function according to the first predictive output representation, by the first layered Transformer decoder layer;

taking the first pointer generator as a first soft switch to select to copy the first word from the fuzzy context according to an attention distribution output by a last decoder layer in the first layered Transformer decoder layer, or to generate a second word from the vocabulary according to the first final probability obtained from the first probability; and generating the clarification question template based on the first word and/or the second word.

Figure 3:
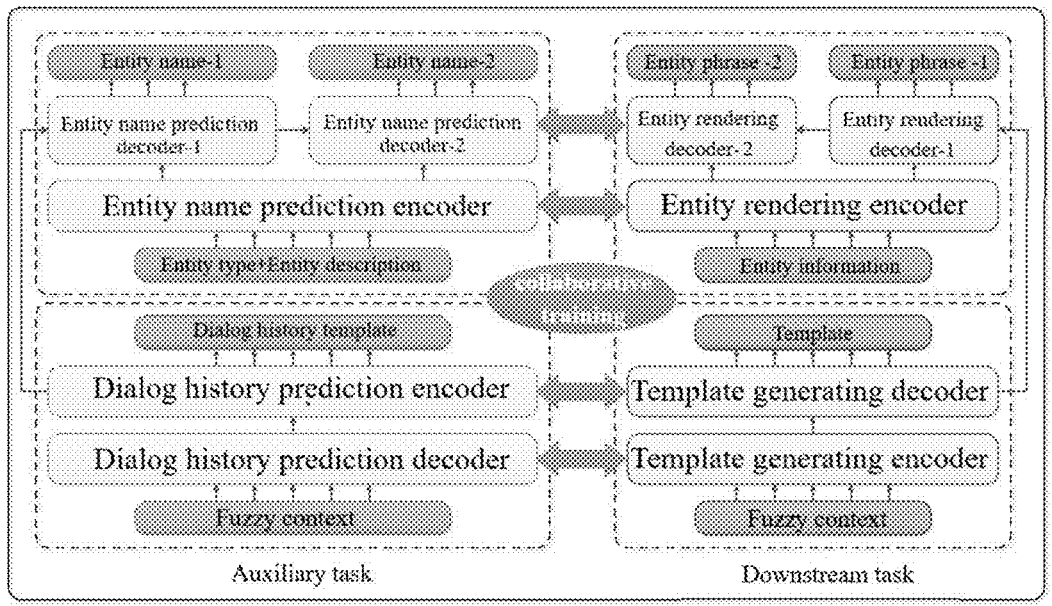
FIG. 3 is a schematic diagram of a cooperative training paradigm according to one or more embodiments of this disclosure.

Generally, as shown in a right side of FIG. 3, in a backbone Coarse-to-fine network, the template generating encoder is configured in this disclosure to convert an input word embedding into a context representation, and the template generating decoder generates a template according to the context representation.

Specifically, the template generating encoder first fills/truncates the context $\{Q_h, R_h, Q_a\}$, and then embeds the filled/truncated context into a word embedding with a length of n and a dimension of $d_{em}$.

Because complex ambiguous dialogue semantics cannot be well extracted by a single-layer Transformer, a layered Transformer structure is designed to deeply understand CQG's dialogue utterances in this disclosure.

The template generating encoder calculates position information coding of a l-th encoder layer according to a previously input word embedding, as follows:

$X_{pe}^{(l)} = \text{pos}(X^{(l-1)})$, where pos is a function that generates position coding.

Then, a updated word representation $X^{(l)}$ is constructed by adding the position coding to the previous word embedding:

$X^{(l)} = X^{(l-1)} + X_{pe}^{(l)}$.

After generating the updated word representation $X^{(l)}$, a normalization layer and multi-head self-attention layers, which jointly pay attention to semantic information from different representation subspaces, are used to capture a relationship between words as follows:

$$S_{X^{(l)}}{}^i = \text{softmax}\left(\frac{(X^{(l)} \cdot Q_i)(X^{(l)} \cdot K_i)^T}{\sqrt{d_{em}}}\right) X^{(l)} \cdot V_i,$$

$S_{X^{(l)}} = \text{concat}(S_{X^{(l)}}{}^1, \ldots, S_{X^{(l)}}{}^h) \cdot O,$
where $Q \in R^{d_{em} \times d_k}, K \in R^{d_{is\,em}{}^{xdis\,k}}, V \in R^{d_{em} \times d_v}, O \in R^{h \cdot d_v \times d_{em}}$ are trainable network parameters; i={1,2, ..., h}, where h represents a number of heads of the multi-head self-attention layers in the Transformer structure; it is set as $d_k=d_v=d_{em}/h$; and $S_X^{(1)}$ is a generated multi-head self-attention representation.

A fully connected position-wise feed-forward layer same as in a standard Transformer is adopted to obtain a context representation of an input sequence as shown below:
$R_{X^{(l)}} = \text{feedforward}(S_{X^{(l)}})$,
where a last layer of $R_{X^{(l)}}$ is configured to decode an output.

In the template generating decoder, a predicted word in step t is generated from an output before step t and context representations from the encoder. An initial input vector of the template generating decoder is set to be <mask>. A difference is that in a solid rendering task, initial inputs of two solid rendering decoders are a vector <A> and a vector <B> respectively, which are generated by the template generating decoder.

An input of the template generating decoder in step t can be formulated as a masked sequence $W_t^0$ as follows:
$W_t^0: \{w_0, w_1, \ldots, w_{t-1}, <\text{mask}>, \ldots, <\text{mask}>\}$,
where $w_{t-1}$ is a predicted output vector in step (t−1); and a length of $W_t^0$ is determined with a preset variable. By adding the same position information encoding as that of the encoder layer, a masked input word embedding of the theldecoder layer is obtained in step t, that is $W_t^{(l)}$.

By masking the input, a multi-head self-attention operation in the template generating decoder is the same as that in the template generating encoder. Layered encoder-decoder attention is further included in this disclosure to obtain attention representations of outputs in step t and at the decoder layer l, as follows:

$$S_{W_t^{(l)}}{}^i = \text{softmax}\left(\frac{(W_t^{(l)} \cdot Q_i)(W_t^{(l)} \cdot K_i)^T}{\sqrt{d_{em}}}\right) W_t^{(l)} \cdot V_i,$$

$$S_{W_t^{(l)}} = \text{concat}\left(S_{W_t^{(l)}}{}^1, \ldots, S_{W_t^{(l)}}{}^h\right) \cdot O,$$

$$A_{W_t^{(l)}}{}^i = \text{softmax}\left(\frac{(S_{W_t^{(l)}} \cdot Q_i)(R_{X^{(f)}} \cdot K_i)^T}{\sqrt{d_{em}}}\right),$$

$$A_{W_t^{(l)}} = \text{concat}\left(A_{W_t^{(l)}}{}^1, \ldots, A_{W_t^{(l)}}{}^h\right),$$

$$C_{W_t^{(l)}} = A_{W_t^{(l)}} \cdot R_{X^{(f)}} \cdot V_i,$$

$$R_{W_t^{(l)}} = \text{feedforward}\left(C_{W_t^{(l)}}\right).$$

where $S_{w_t^{(l)}}$ is a multi-head self-attention representation; $A_{w_t^{(l)}}$ is a contextual attention distribution; $R_X^{(f)}$ is a context representation of the input sequence from the last encoder layer; $C_{w_t^{(l)}}$ is a context attention representation; and $R_{w_t^{(l)}}$ is a final representation of an output sequence in step t.

Afterwards, a probability of generating a word from the preset vocabulary is calculated using a softmaxfunction according to $R_{w_t^{(l)}}$:
$p(w_t) = \text{softmax}(R_{w_t^{(l)}})$
where $R_{w_t^{(l)}}$ is a representation of a predicted output processed by the last layer of the decoder in step t.

For the OOV problem in tasks related to text generation, a pointer generator mechanism is designed in this disclosure. A pointer generator output correspondingly in step t is calculated as follows:
$P_{gen}(w_t) = \text{sigmoid}(C_{w_t^{(l)}} \cdot H + b_{pg})$
where $C_{w_t^{(l)}}$ is a corresponding context vector of the last decoder layer; H and $b_{pg}$ are learnable network parameters; and sigmoid is an activation function that converts a vector into a constant.

Thereafter, $p_{gen}$ serves as a soft switch to sample and copy a word from the input text according to the attention distribution $A_{w_t^{(l)}}$ of the last decoder layer, or to generate the word from the preset vocabulary according to $p(w_t)$. In this disclosure, words appearing in the input text are adopted to expand the preset vocabulary, and to obtain a following probability distribution on the preset vocabulary:
$P(w_t) = p_{gen}(w_t)p(w_t) + (1-p_{gen}(w_t))\Sigma_{i:w_i=w_t}(A_{w_t^{(l)}})_i$,
where $P(w_t)$ is a final probability of generating the word. If it is an OOV word, then $p(w_t)$ is zero; and if $w_t$ does not appear in the input text, then $\Sigma_{i:w_i=w_t}(A_{w_t^{(l)}})_i$ is zero. The backbone network course-to-fine is limited by their preset vocabulary, and the pointer generator mechanism can generate OOV words.

In this disclosure, by designing pointer generators for the decoders in the template generating task and the entity rendering task respectively, a corresponding probability of generating a word in each task can be obtained, namely, $P(w_t)$, $P(a_t)$ and $P(b_t)$, and a respective word can be generated from the vocabulary base according to the corresponding probability, so as to solve a problem of unregistered words.

In S3, the entity information is input into an entity rendering module of the CQG neural network model so as to obtain at least one entity phrase.

In some embodiments, the entity rendering module includes an entity rendering encoder and an entity rendering decoder.

The entity rendering encoder includes a second layered Transformer encoder layer.

The entity rendering decoder includes a second layered Transformer decoder layer and a second pointer generator.

Inputting the entity information into the entity rendering module so as to obtain the at least one entity phrase includes:
forming a second word embedding with the predetermined length and the predetermined dimension based on the entity information;
converting, by the second layered Transformer encoder layer, the second word embedding into a second layered context representation; and
generating the at least one entity phrase based on the second layered context representation by the second layered Transformer decoder layer and the second pointer generator.

In some embodiments, generating the at least one entity phrase by the second layered Transformer decoder layer and the second pointer generator includes:
generating a second predictive output representation based on the second layered context representation and calculating a second probability of generating words from the vocabulary by using a softmax function according to the second predictive output representation, by the second layered Transformer decoder layer;
taking the second pointer generator as a second soft switch to select to copy the third word from the entity information according to an attention distribution output by a last decoder layer in the second layered Transformer decoder layer, or to generate a forth word from the vocabulary according to the second final probability obtained from the second probability; and generating the at least one entity phrase based on the third word and/or the fourth word.

Generally, as shown in the right side of FIG. 3, the input entity information are filled/truncated in the entity rendering task, and then embedded into the word embedding with a same length and a dimension of $d_{em}$. After randomly initializing the embedding, the entity information coding is encoded and obtained by an entity rendering encoder with a same internal mechanism as the template generating encoder, and the entity rendering decoder takes vector representations of <A> and <B> obtained in the template generating task as an initial state to decode and generate two entity phrases $p_1$ and $p_2$.

Figure 4:
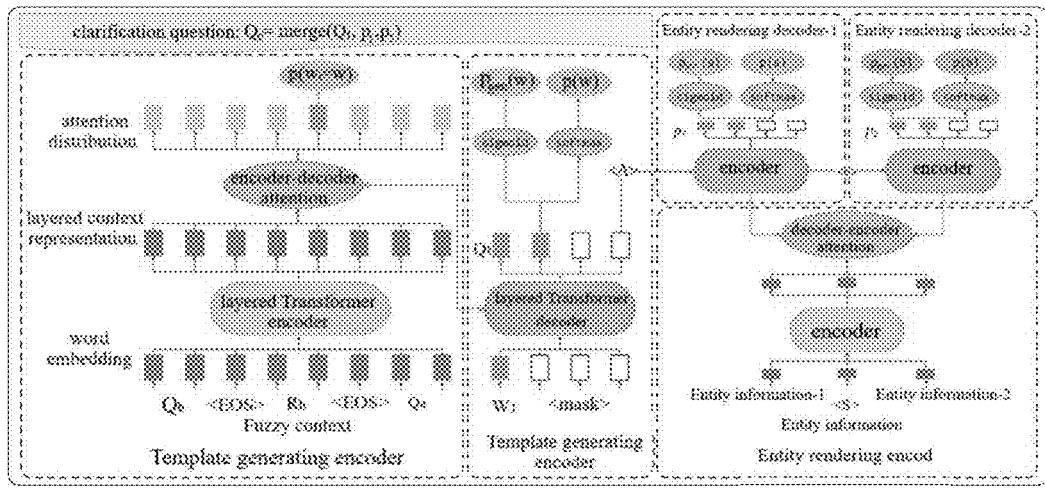
FIG. 4 is a schematic diagram of a CQG neural network model according to one or more embodiments of this disclosure.

As shown in FIG. 4, in this disclosure, layered Transformer encoder and decoder layers are further introduced for entity rendering tasks. The internal mechanisms of the entity rendering encoder and the template generating encoder are the same, and internal operation mechanisms of the entity rendering decoder and the template generating decoder are the same, which will not be repeated here.

In S4, a clarification question for a fuzzy question is generated based on the clarification question template and the at least one entity phrase for presenting to the user.

In this disclosure, these two entity phrases are input into the generated template to generate the final clarification question.

In some embodiments, the CQG neural network model is trained with a collaborative training paradigm, which combines an auxiliary task based on self-supervised learning with a downstream CQG task for end-to-end training.

Specifically, after two self-monitoring auxiliary tasks and their corresponding data sets are formalized, as shown in FIG. 3, a collaborative training paradigm is proposed in this disclosure, which includes an end-to-end training process, that is, a task-guided collaborative training process. Different from a widely used two-stage pre-training and fine-tuning paradigm (the latter is usually complicated and time-consuming), the collaborative training paradigm proposed in this disclosure is simple but effective, with a relatively low complexity. In the collaborative training paradigm, training instances in the self-monitoring data set of the auxiliary task and the manually annotated data set of the downstream task are sequentially mixed, and then transferred to a model framework proposed in the CQG neural network model to train for the minimum total loss. Shared parameters of auxiliary task learning can make a training process of the downstream task closer to a optimal point and avoid falling within a local minimum loss. The training of the auxiliary tasks can provide a deep understanding of ambiguous sentences and interactions between a user and a system in the downstream tasks.

In some embodiments, training instances are randomly sampled from a mixed training set of the auxiliary task based on self-supervised learning and the downstream CQG task to input to the CQG neural network model to train for a minimum total loss.

In a training stage, each training instance consists of two inputs and three outputs. For the downstream task, the two inputs are the fuzzy context and the entity information, and corresponding outputs are the clarification question template and the two entity phrases. For the auxiliary task, the two inputs are the fuzzy question and entity information whose entity name is masked, and corresponding outputs are the dialog history template and two entity names.

In this disclosure, training instances are randomly sampled from a mixed training set of the auxiliary task and the downstream task to jointly train the model. Since a training of SHiP is a multi-task problem, in this disclosure, the neural network is trained by minimizing a sum of the following three negative log-likelihood losses to determine to best training ending time:

$$\mathcal{L}_\theta(Q_t) = -\sum_{i=1}^{I} \log P(w_i \mid C, w < i),$$

$$\mathcal{L}_\theta(p_1) = -\sum_{j=1}^{J} \log P(a_j \mid X, a < j),$$

$$\mathcal{L}_\theta(p_2) = -\sum_{k=1}^{K} \log P(b_k \mid X, b < k),$$

$$\mathcal{L}_{total} = \mathcal{L}_\theta(Q_t) + \mathcal{L}_\theta(p_1) + \mathcal{L}_\theta(p_2) + \Phi,$$

where $\theta$ represents a parameter set; and $\Phi$ is a regularization parameter. In this way, the SHiP can generate a template for clarification question and two entity phrases for each ambiguous fuzzy multi-turn dialogue according to a generation probability of a word in each step.

In some embodiments, the fuzzy context includes a historical question, a historical answer and a fuzzy question. The entity information includes an entity name, an entity type and an entity description.

The auxiliary task based on self-supervised learning includes a dialogue history prediction auxiliary task and an entity name prediction auxiliary task.

In this disclosure, an effective self-monitoring target is designed to facilitate generating reasonable clarification questions. Firstly, two auxiliary tasks of subtasks in the course-to-fine process are designed to assist the downstream CQG task. Structures of the auxiliary tasks and the downstream CQG task are shown in FIG. 3.

A dialog history template is generated by screening the entity name according to the fuzzy question in the dialog history prediction auxiliary task.

Specifically, according to the template generating task, a first auxiliary task, that is, the dialog history prediction auxiliary task, is proposed in this disclosure to predict previous dialog history of a given fuzzy question. As shown in a lower left of FIG. 3, for the dialog history prediction auxiliary task, an ambiguous question $Q_a$ is input in this disclosure for predicting dialogue history, that is {$Q_h$, $R_h$}. Generally, two entities related to the ambiguous question will be involved in the dialogue history. These two related entities are masked in this disclosure, and two special symbols <C> and <D> are used to represent their positions respectively, thus generating the dialog history template. Vector of two symbols decoded in this task is adopted to initialize a decoder status of the entity name of the second auxiliary task, respectively. According to an input and output of the dialog history prediction auxiliary task, the ambiguous turns of dialogues in the training data set are divided, and a subset of an initial data set without manual annotation is obtained.

At least one predicted entity name is generated according to the entity type and the entity description in the entity name prediction auxiliary task.

Specifically, according to the entity rendering task, a second auxiliary task, namely the entity name prediction auxiliary task, is proposed in this disclosure to predict a names of an entity involved. Specifically, as shown in an upper left of FIG. 3, for the entity name prediction auxiliary task, information of the entity involved is input by masking the entity name, that is, $\{T_1, D_1, T_2, D_2\}$. This task aims to predict names of two related entities, namely $e_1$ and $e_2$, and to get the predicted entity name. According to an input and output of the entity name prediction auxiliary task, given information of the entities in the training data set can be divided, and the related data set also can be obtained without any manual annotation in this disclosure.

In the dialog history prediction auxiliary task, a prediction history question and a prediction history question answer are generated according to the dialog history template and the predicted entity name, and finally a dialog history is generated according to the predicted history and the predicted history answer.

Specifically, the predicted entity name is sent to the generated dialog history template to generate a final dialog history.

The CQG neural network model is constructed by adding a layered Transformer mechanism and a pointer generator mechanism into a coarse-to-fine CTF neural network model.

Based on a same inventive concept, a device for clarification question generation is provided in one or more embodiments of this disclosure, which includes an entity information extraction module, a clarification question template generation module, an entity phrase generation module, and a clarification question generation module.

The entity information extraction module is configured to extract entity information from a fuzzy context in response to receiving the fuzzy context including historical questions, historical answers and fuzzy questions input by a user.

The clarification question template generating module is configured to input the fuzzy context into a template generating module of a pre-built CQG neural network model so as to obtain a clarification question template.

The entity phrase generation module is configured to input the entity information into an entity rendering module of the CQG neural network model so as to obtain at least one entity phrase.

The clarification question generation module is configured to generate a clarification question for a fuzzy question based on the clarification question template and the at least one entity phrase for presenting to the user.

The CQG neural network model is constructed by adding a layered Transformer mechanism and a pointer generator mechanism into a coarse-to-fine CTF neural network model.

On a basis of the same concept, an electronic device is also provided in one or more embodiments of this disclosure, which includes a memory, a processor and a computer program stored on the memory and operable by the processor. The processor implements the method described in any one of the above embodiments when executing the computer program.

Compared with other baseline models, performance of the method for clarification question generation based on the self-monitoring layered Transformer and pointer generator mechanisms (SHiP) in this disclosure is presented. Other baselines and self-monitoring layered Transformer and pointer generator mechanisms (SHiP) are summarized as follows:

Seq2Seq: It is adapted from a traditional encoder-decoder framework, in which the fuzzy context is first encoded into a dense hidden vector, and then target clarification questions are decoded in turn.

Transformer: it is similar to Seq2Seq, and this baseline model adopts Transformer instead of a RNN unit in Seq2Seq encoder and decoder, and Transformer is based on an attention mechanism only.

Course-to-fine: it is a multi-task framework, which composed of a template generating task and an entity rendering task. A template and an entity phrase respectively generated by respective tasks constitute the final clarification question.

SHiP: it is model foundation of this disclosure, and is based on an end-to-end self-monitoring framework, which combines a layered Transformer mechanism and a pointer generator mechanism to generate clarification questions.

A data set for evaluating the performance is collected from a publicly available open domain data set, that is, CLAQUA released in 2019. CLAQUA covers various fields and supports three clarification-related tasks, namely clarification identification, clarification question generation and clarification-based question and answer, which involves both single turn and multiple turns of dialogues. The data set used in this disclosure is concentrated in a fuzzy multi-turn dialogue scene, which contains 12173, 372 and 384 instance for training, verification and testing, respectively. With regard to an evaluation index, this disclosure regards the clarification question generation is regarded as a Seq2Seq question in this disclosure, aiming at generating a standard-answer clarification question close to manual annotation. Therefore, in this disclosure, BLEU and ROUGE are adopted as the evaluation index of this disclosure, which are widely used in text generation tasks.

The word embedding is initialized randomly, and is used as a network parameter to be fine-tuned with a model training In order to maintain consistency, the encoder and decoder of this disclosure share a same vocabulary set. A size of word embedding and a size of a hidden layer are set to be 128, a number and a size of a multi-head mechanism in Transformer are set to be 8 and 16 respectively, the numbers of layers of the encoder and the decoder are set to be 2, the model of this disclosure is trained in a mini-batch mode, and a learning rate of each period is changed with a exponential decay to avoid over-fitting. A batch size is 32, a dropout size is 0.1. In addition, an initial learning rate is 2*10−3 with a decay rate of 0.5, and the adaptive moment (Adam) estimation is used to optimize loss.

Performance of all baselines and the SHiP model of this disclosure is given in terms of BLEU and ROUGE indexes respectively In Table 1 and Table 2.

TABLE 1

Performance of a model on BLEU indexes

| Model | BLEU-1 | BLEU-2 | BLEU-3 | BLEU |
|---|---|---|---|---|
| Seq2Seq [2] | 56.92 | 49.17 | 44.15 | 40.38 |
| Transformer [32] | 62.72 | 54.48 | 49.24 | 45.30 |
| Coarse-to-fine [35] | <u>63.82</u> | <u>55.94</u> | <u>50.69</u> | <u>46.53</u> |
| SHiP | 65.60 | 58.43 | 53.59 | 49.67 |

A BLEU index in a last column usually refers to BLEU-4. In each column, a best baseline and a best performance are shown with underline and bold letters respectively;

TABLE 2

Performance of a model on ROUGE indexes

| Model | ROUGE-L | ROUGE-1 | ROUGE-2 |
|---|---|---|---|
| Seq2Seq [2] | 53.55 | 57.86 | 42.66 |
| Transformer [32] | 56.32 | 62.08 | 45.89 |
| Coarse-to-fine [35] | <u>57.99</u> | <u>64.39</u> | <u>49.03</u> |
| SHiP | 60.26 | 65.23 | 51.11 |

In each column, a best baseline and a best performance are shown with underline and bold letters respectively.

As shown in Table 1, in the baseline, the Transformer model is superior to a traditional Seq2Seq model in all BLEU indexes, which proves effectiveness of the Transformer structure for the clarification question generation. In addition, when a same Transformer structure is applied to the encoder and the decoder, the Coarse-to-fine model shows superiority compared with the Transformer model, which means that generating the clarification question template and the entity phrase separately can improve efficiency of clarification questions solving. The SHiP model shows best performance, and BLEU-1, BLEU-2, BLEU-3 and BLEU are improved by 2.79%, 4.45%, 5.72% and 6.75% respectively compared with the best baseline model. Obviously, with an increase of N-grams, that is, from BLEU-1 to BLEU, improvement provided by the SHiP model relative to the Coarse-to-fine model is increasing, which indicates that the model of this disclosure can generate not only accurate but also smooth clarification questions.

As for ROUGE indexes, similar results can be observed in Table 2. Specifically, performance provided by the SHiP model in terms of ROUGE-L, ROUGE-1 and ROUGE-2 has been improved by 3.91%, 1.30% and 4.24% respectively. These results show that the model of this disclosure can produce clarification questions with high recall rate and consistency, because the SHiP model is obviously better than the Coarse-to-fine model in terms of ROUGE-L, compared with that in terms of ROUGE-1. In addition, compared with the baseline model, the model of this disclosure presents more improvement in BLEU metrics than in ROUGE metrics. It shows that the pointer generator mechanism designed in this disclosure can solve the OOV problem well, which is facilitating avoiding noise and eliminating irrelevant words in the generated clarification questions.

Figure 6:
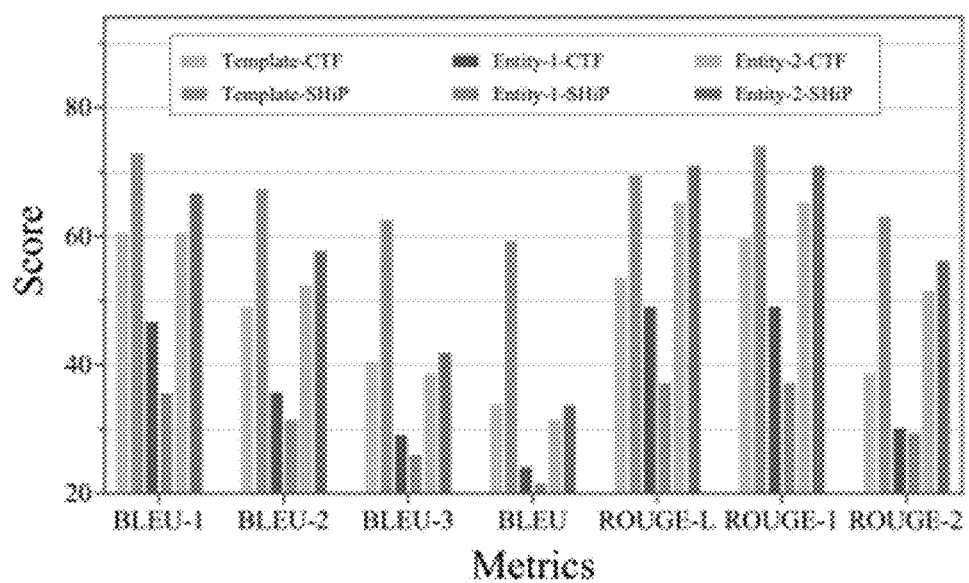
FIG. 6 is a schematic diagram of performance of the CQG neural network model under different tasks according to one or more embodiments of this disclosure.

In this disclosure, performance provided by the SHiP model and the best baseline course-to-fine model is extensively checked on different subtasks, that is, comparison of the subtasks of template generating, entity -1 generation and entity -2 generation in FIG. 6 shows the performance of the SHiP and the best baseline course-to-fine model, where CTF represents the course-to-fine model.

As shown in FIG. 6, the SHiP model proposed in this disclosure is superior to the best baseline model for template generating and entity -2 generation tasks. Specifically, compared with the entity -2 generation task, SHiP model presents more obvious improvement in the template generating task than the Coarse-to-fine model. For example, BLEU and ROUGE-2 are improved by 75.40% and 63.44% respectively in the template generating task. This phenomenon shows that the first auxiliary task designed in this disclosure, that is, the dialogue history prediction task, can facilitate generating templates that are smoother and more accurate than the best baseline model by introducing learned semantic features into the downstream task. In addition, the SHiP model provides more improvement than the Coarse-to-fine model in terms of BLEU indexes, compared with that in terms of ROUGE indexes.

For the entity -1 generation task, compared with the best baseline model, the SHiP model presents 11.57%-31.20% loss in terms of BLEU indexes and 2.45%-31.85% loss in terms of ROUGE indexes. Because in the second auxiliary task, namely the entity name prediction task, a position of a first entity name is far from a position of a second entity, while in the downstream entity rendering task, the two entity phrases are usually close to each other. Therefore, it is difficult for the downstream task to make use of information learned and provided by the auxiliary tasks, which will bring noise to learning of the downstream task in this disclosure, thus affecting the performance.

Meanwhile, influence of the self-monitoring auxiliary tasks proposed in this disclosure, that is, the influence of the two auxiliary tasks on the performance of the SHiP model and the best baseline Coarse-to-fine model, is studied. In this disclosure, a SHiP model without a self-monitoring target is regarded as a HiP model. For the Coarse-to-fine model, in this disclosure, results after adding the self-monitoring target (expressed as CTF+SS) are checked, and growth rates of the SHiP model relative to the HiP model and CTF+SS relative to the Coarse-to-fine model are plotted in FIG. 7. FIG. 7 shows performance improvement rate of the model with the auxiliary task over the model without the auxiliary task, in which CTF+SS/CTF, SHiP/HiP represent comparison between the models with and without the self-monitoring target added on the Coarse-to-fine and HiP respectively. As shown in FIG. 7, in terms of the BLEU indexes (BLEU-1, BLEU-2, BLEU-3 and BLEU) and the ROUGE indexes (ROUGE-L, ROUGE-1 and ROUGE-2), performance of HiP and the Coarse-to-fine model has been improved after applying the self-monitoring target, except in terms of the ROUGE-L index for the HiP and in terms of the ROUGE-1 index for the Coarse-to-fine model. For example, the HiP and the Coarse-to-fine model can provides improvement of 1.89% and 4.88% in terms of the BLEU indexes respectively after adding the self-monitoring target. This may be because the self-monitoring target can extract rich semantic features from the fuzzy context for the HiP and Coarse-to-fine model. For reduced aspects, that is, the Rough-L index for the HiP and the Rough -1 index for the Coarse-to-fine model, due to the second auxiliary task, that is, the entity name prediction auxiliary task, noise is introduced into the entity-1 generating subtask.

Performance of the HiP is checked after removing basic components (namely, the layered Transformer mechanism and the pointer generator mechanism) respectively. As shown in FIG. 8, HiP-Hier and HiP-PG respectively represent the HiP without the layered Transformer mechanism and the pointer generator mechanism, and performance of the model after removing the components is shown.

As shown in FIG. 8a, after components are removed separately, the performance of the HiP is degraded in terms of all BLEU indexes. For example, performance of the HiP-PG and the HiP-Hier in terms of the BLEU indexes is reduced by 2.19% and 1.42% over the HiP, respectively. Obviously, in terms of the BLEU indexes, removing the pointer generator mechanism will produce worse performance than removing the layered Transformer mechanism. Specifically, in terms of BLEU-1, BLEU-2 and BLEU-3, the performance of the HiP-PG decreased by 0.40%, 0.87% and 1.60% respectively. However, performance degradation rates of the HiP-Hier is low, which is 0.06%, 0.59% and 0.99% respectively. Because the pointer generator mechanism facilitates excluding irrelevant words, resulting in higher BLEU scores.

As shown in FIG. 8b, in terms of the ROUGE indexes, although results of the HiP-PG, the HiP-Hier and the HiP on the ROUGE-1 index are similar, performance of the HiP in terms of ROUGE-2 and ROUGE-L is better than that of the HiP-PG and the HiP-Hier. For example, in terms of the ROUGE-2 index, the performance of the HiP-Hier is decreased by 1.21% over the HiP, and the performance of the HiP-PG is decreased by 0.87% over the HiP. It shows that the layered Transformer mechanism can facilitate capturing comprehensive and relevant information from the fuzzy context, thus generating clarification questions with high consistency.

In this disclosure, two examples are randomly selected from the test set, and the clarification questions generated by the best baseline Coarse-to-fine model and the SHiP model on which the method of this disclosure is based are shown in Table 3.

TABLE 3

Examples of clarification questions generated by the best baseline model and the SHiP model and a standard-answer clarification question (Ground Truth)

| | Context | $Q_h$: Which music artist is similar to James Vernon Taylor? $R_h$: Lindsey Buckingham $Q_a$: Mention the name of the parent. |
|---|---|---|
| Example 1 | Coarse-to-fine | When you say the artist for the to, here? |
| | SHiP | Who are you referring to, when you say the parent, Morris Buckingham or artist Lindsey Buckingham? |
| | Ground Truth | Are you talking about theatrical composer James Vernon Taylor or celebrity Lindsey Buckingham, when you say the parent? |
| | Context | $Q_h$: What is sequel of the Ipcress File? $R_h$: Funeral in Berlin $Q_a$: Mention the name of the director. |
| Example 2 | Coarse-to-fine | The Ipcress File or Funeral in Berlin is the episode being referred to, here? |
| | SHiP | When you say the movie director, are you talking about winning work The Ipcress File or Funeral in Berlin? |
| | Ground Truth | When you say the movie director, are you talking about winning work The Ipcress File or Funeral in Berlin? |

A phrase-overlapping span between the generated clarification questions and a standard answer are highlighted.

As shown in Table 3, for these two examples, the fuzzy context (Context), the standard-answer clarification question, and clarification questions generated by the Coarse-to-fine model and the SHiP model are given respectively. Overlapping phrases in each generated clarification question and the standard answer clarification question are highlighted.

In Example 1, the clarification questions generated by the course-to-fine model are meaningless and low in readability, while the SHiP generates fluent and accurate clarification questions, which covers more phrases in the standard answer clarification question. As shown in Example 2, both the Course-to-Fine model and the SHiP model can capture related entities from the context, namely "Ipcress File" and "Funeral in Berlin", but the clarification questions generated by the Course-to-Fine model are still difficult to understand, and results generated by the SHiP model are easier to understand. This is because the dialog history prediction auxiliary task combined with the template generating task can generate an accurate template for clarification questions, and the template generating subtask has brought significant performance improvement for the SHiP model. In addition, the clarification questions generated by the SHiP model cover more part of the standard answer so as to clarify content of the questions than the Coarse-to-fine model. Because the layered Transformer mechanism can facilitates extracting more relevant and comprehensive information from the fuzzy context.

This disclosure mainly solves a problem of clarification question generation in fuzzy multi-turn dialogues. In a network model of this disclosure, the downstream CQG task is cooperatively trained with two well-designed self-supervised learning auxiliary tasks, and combined with the layered pointer generation mechanism, ambiguous sentences can be deeply understood and the OOV problem can be effectively solved. The layered Transformer module can facilitate generating clarification questions with higher coherence, while the pointer generator module can facilitate generating clarification questions with fewer irrelevant words. With a task-guided collaborative training paradigm, rich semantic features can be effectively acquired from the fuzzy dialogue of the downstream CQG tasks with limited labeled training data.

It can be seen from the above that the method, the device and the electronic device for clarification question generation are provided in one or more embodiments of this disclosure, in which the layered Transformer mechanism and the pointer generator mechanism are added to a CQG clarification question generation neural network model, and two self-supervised learning auxiliary tasks, namely the dialogue history prediction auxiliary task and the entity name prediction auxiliary task, are formulated, and the layered Transformer mechanism and the pointer generator mechanism are introduced to solve problems of insufficient processing of Out-of-Vocabulary (OOV) and lacking of fuzzy semantic representation. An end-to-end collaborative training mode is proposed to train the auxiliary task and the downstream CQG task simultaneously. Experiments performed in this disclosure on the published data set CLAQUA show that BLEU and ROUGE-L indexes are improved by 6.75% and 3.91% respectively compared with most advanced methods. And this disclosure is a first invention in which a self-supervised learning is applied to CGQ clarification question generation and to solve an OOV problem in CQG.

It can be understood that this method can be implemented by any apparatus, device, platform and device cluster with computing and processing capabilities.

It should be noted that the method of one or more embodiments of this disclosure can be performed by a single device, such as a computer or a server. The method of this embodiment can also be applied to distributed scenarios, which is completed by cooperation of multiple devices. In this distributed scenario, one of the devices can only perform one or more of the steps in the method of one or more embodiments of this disclosure, and the devices can interact with each other to complete the method.

It should be noted that specific embodiments of this disclosure have been described above. Other embodiments are within the scope of the appended claims. In some cases, actions or steps recited in the claims may be performed in an different order from that in the embodiments and still achieve the desired results. In addition, the processes depicted in the drawings do not necessarily require the specific or sequential order shown to achieve the desired results. In some embodiments, multitasking and parallel processing are also possible or may be advantageous.

For convenience of description, when the above devices are described, it is made for various modules in terms of functions. Of course, when one or more embodiments of this disclosure are implemented, the functions of each module can be implemented in one or more pieces of software and/or hardware.

The device in the above embodiments is used to implement the corresponding method in the above embodiments, and present beneficial effects of the corresponding method embodiments, which will not be described in detail here.

Figure 5:
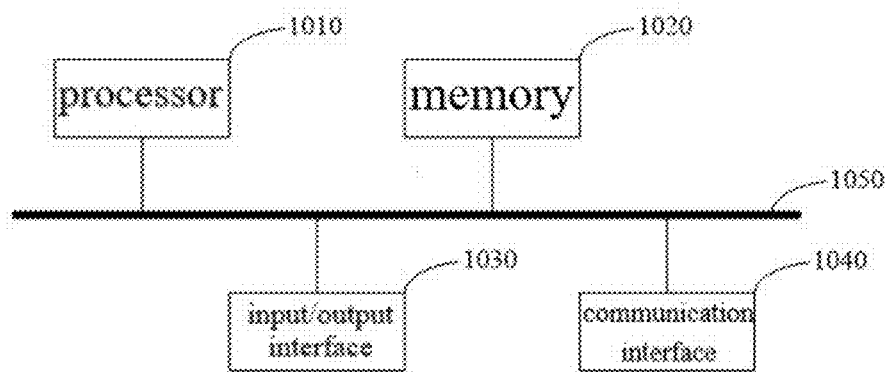
FIG. 5 is a schematic diagram of a hardware structure of an electronic device according to one or more embodiments of this disclosure.

FIG. 5 shows a more specific hardware structure diagram of an electronic device provided in this embodiment, which may include a processor 1010, a memory 1020, an input/output interface 1030, a communication interface 1040 and a bus 1050. A communication connection with each other is realized among the processor 1010, the memory 1020, the input/output interface 1030 and the communication interface 1040 in the device through the bus 1050.

The processor 1010 can be implemented by a general-purpose CPU (Central Processing Unit), a microprocessor, an application specific integrated circuit (ASIC), or one or more integrated circuits, etc., and is used for executing relevant programs to realize technical schemes provided in the embodiments of this specification.

The memory 1020 can be implemented in a form of ROM (Read Only Memory), RAM (Random Access Memory), static storage device, dynamic storage device, or the like. The memory 1020 can store the operating system and other application programs. When the technical schemes provided in the embodiments of this specification is implemented by software or firmware, relevant program codes are stored in the memory 1020 and called and executed by the processor 1010.

The input/output interface 1030 is used to connect the input/output module to realize information input and output. The input/output module can be configured as a component in the device (not shown in the figure), or it can be externally connected to the device to provide corresponding functions. An input device can include a keyboard, a mouse, a touch screen, a microphone and various sensors, and an output device can include a display, a speaker, a vibrator and an indicator.

The communication interface 1040 is used to connect with a communication module (not shown in the figure) to realize communication interaction between the device and other devices. The communication module can communicate by wired means (such as USB, network cable, etc.) or by wireless means (such as mobile network, WIFI, Bluetooth, etc.).

The bus 1050 includes a path for transmitting information among various components of the device, such as the processor 1010, the memory 1020, the input/output interface 1030 and the communication interface 1040.

It should be noted that although the above device only shows the processor 1010, the memory 1020, the input/output interface 1030, the communication interface 1040 and the bus 1050, in the specific implementation process, the device may also include other components necessary for normal operation. In addition, it can be understood by those skilled in the art that the above-mentioned device may only contain the components necessary for implementing the embodiments of this specification, and need not contain all the components shown in the drawings.

The electric device in the above embodiments is used to implement the corresponding method in the above embodiments, and present beneficial effects of the corresponding method embodiments, which will not be described in detail here.

The computer-readable media of this embodiment includes permanent or non-permanent, removable or non-removable media, and information storage can be realized by any method or technology. The information can be a computer-readable instruction, a data structure, a module of programs, or other data. Examples of the storage media of computers include, But not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic tape cartridge, magnetic tape, magnetic disk storage or other magnetic storage devices or any other non-transmission medium that can be used to store information that can be accessed by computing devices.

Figure 9:
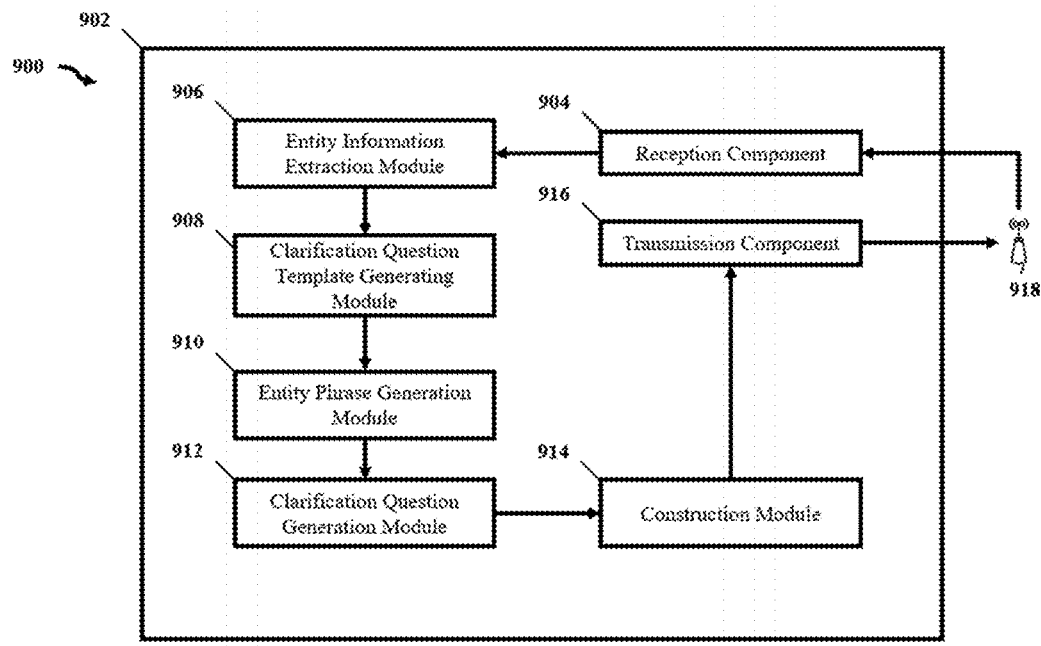
FIG. 9 is a conceptual data flow diagram illustrating the data flow between different means/components in an exemplary apparatus according to an embodiment of the present disclosure.

FIG. 9 is a conceptual data flow diagram 900 illustrating the data flow between different means/modules in an exemplary apparatus 902. Apparatus 902 includes a reception component 904, an Entity Information Extraction Module 906, a Clarification Question Template Generating Module 908, an Entity Phrase Generation Module 910, an Entity Phrase Generation Module 912, a construction module 914, and a transmission component 916.

Apparatus 902 may communicate with receiver 918, where receiver 918 may receive data from a user and transmit the data to apparatus 902. Receiver 918 may include one or more input devices, where the input devices may be one or more of a microphone, camera, camcorder, biometric scanner, keyboard, mouse, touchpad, touchscreen, controller, etc. Receiver 918 may transmit the data to reception component 904. The data may be a fuzzy context input from the user, and the reception component 904 may be configured to transmit the fuzzy context input to Entity Information Extraction Module 906.

Entity Information Extraction Module 906 may be configured to extract entity information from a fuzzy context in response to receiving the fuzzy context input by a user. Clarification Question Template Generating Module 908 may be configured to input the fuzzy context into a template generating module of a pre-built CQG neural network model so as to obtain a clarification question template. Entity Phrase Generation Module 910 may be configured to input the entity information into an entity rendering module of the CQG neural network model so as to obtain at least one entity phrase. Entity Phrase Generation Module 912 may be configured to generate a clarification question for a fuzzy question based on the clarification question template and the at least one entity phrase for presenting to the user.

Construction module 914 is configured to generate a Clarification Question Generation (CQG) neural network model by adding a layered Transformer mechanism and a pointer generator mechanism into a coarse-to-fine model.

Transmission component 916 is configured to transmit the results of apparatus 902 to receiver 918. The output devices may be, for example, without limitation, one or more of a display device, a printer, a speaker, a projector, etc.

Figure 2:
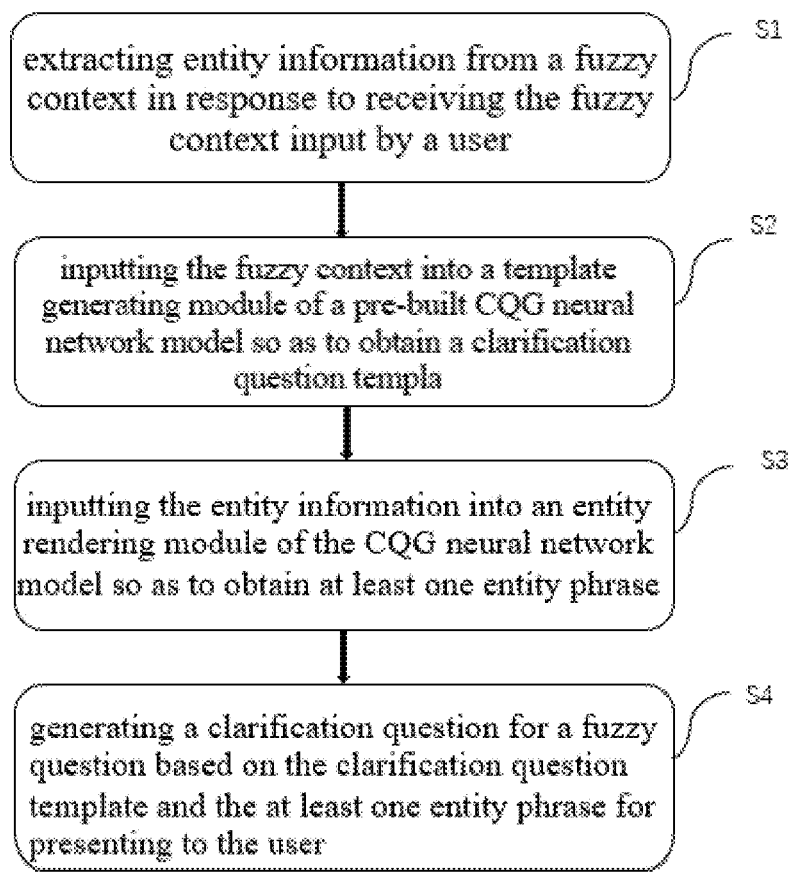
FIG. 2 is a flowchart of a method for clarification question generation according to one or more embodiments of this disclosure.

The apparatus may include additional modules and components that perform each of the blocks of the algorithm in the aforementioned flowchart of FIG. 2. As such, each block in the aforementioned flowchart of FIG. 2 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
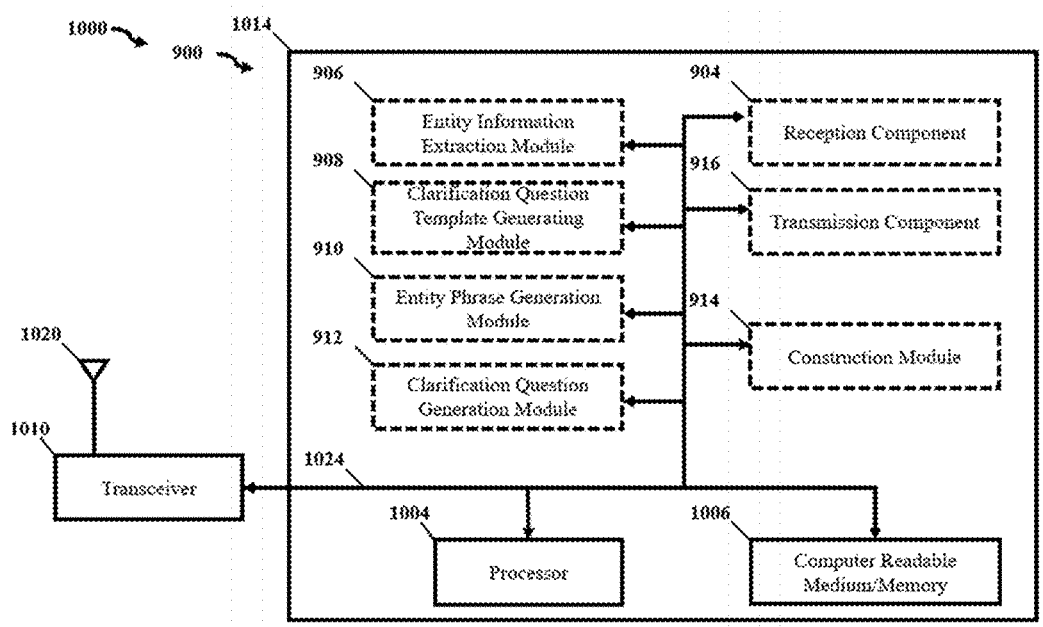
FIG. 10 is a diagram illustrating an example of a hardware implementation for an apparatus employing a processing system according to an embodiment of the present disclosure.

FIG. 10 is a diagram 1000 illustrating an example of a hardware implementation for an apparatus 902 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, reception component 904, the modules 906, 908, 910, 912, and 914, transmission component 916 and the computer-readable medium / memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 916, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the modules 906, 908, 910, 912, and 914. The modules may be software components running in the processor 1004, resident/stored in the computer readable medium/memory 1006, one or more hardware components coupled to the processor 1004, or some combination thereof. In one embodiment, the computer readable medium/memory 1006 is a non-transitory computer readable medium.

In one configuration, the apparatus 902 includes means for extracting entity information from a fuzzy context in response to receiving the fuzzy context including historical questions, historical answers and fuzzy questions input by a user, means for inputting the fuzzy context into a template generating module of a pre-built CQG neural network model so as to obtain a clarification question template, means for inputting the entity information into an entity rendering module of the CQG neural network model so as to obtain at least one entity phrase, means for generating a clarification question for a fuzzy question based on the clarification question template and the at least one entity phrase for presenting to the user, and means for generating a Clarification Question Generation (CQG) neural network model by adding a layered Transformer mechanism and a pointer generator mechanism into a coarse-to-fine model. The aforementioned means may be one or more of the aforementioned modules of the apparatus 902 and/or the processing system 1014 of the apparatus 902 configured to perform the functions recited by the aforementioned means.

It should be understood by those of ordinary skill in the art that discussion of any of the above embodiments is only exemplary, and is not intended to imply that the scope of the disclosure (including the claims) is limited to these examples; under the idea of this disclosure, the technical features in the above embodiments or different embodiments can also be combined, and the steps can be realized in any order; and there are many other changes in different aspects of one or more embodiments of this disclosure as described above, which are not provided in details for brevity.

In addition, in order to simplify the description and discussion, and in order not to make the one or more embodiments of this disclosure difficult to understand, well-known power/ground connections with integrated circuit (IC) chips and other components may or may not be shown in the provided drawings. In addition, the devices can be shown in the form of block diagrams in order to avoid making the one or more embodiments of this disclosure difficult to understand, and this also takes into account the fact that the details about the implementation of these devices in block diagram are highly dependent on a platform on which the one or more embodiments of this disclosure will be implemented (i.e., these details should be completely within an understanding range of those skilled in the art). While specific details (e.g., circuits) have been set forth to describe exemplary embodiments of the present disclosure, it will be apparent to those skilled in the art that the one or more embodiments of this disclosure may be practiced without these specific details or with variations in these specific details. Therefore, these descriptions should be regarded as illustrative rather than restrictive.

Although the present disclosure has been described in conjunction with specific embodiments thereof, many alternatives, modifications and variations of these embodiments will be apparent to those of ordinary skill in the art based on the foregoing description. For example, the discussed embodiments can be applied in other memory architectures (such as dynamic RAM (DRAM)).

One or more embodiment of the present disclosure are intended to cover all such alternatives, modifications and variations that fall within the broad scope of the append claims. Therefore, any omissions, modifications, equivalent substitutions, improvements, etc. made within the spirit and principles of one or more embodiment of this disclosure shall be encompassed within the protection scope of this disclosure.

What is claimed is:

1. A method for clarification question generation executed by a processor, comprising:
   extracting entity information from a fuzzy context in response to receiving the fuzzy context including historical questions, historical answers and fuzzy questions input by a user via an input interface;
   generating a Clarification Question Generation (CQG) neural network model by adding a layered Transformer mechanism and a pointer generator mechanism into a coarse-to-fine model;
   inputting the fuzzy context into a template generating module of the CQG neural network model so as to obtain a clarification question template;
   inputting the entity information into an entity rendering module of the CQG neural network model so as to obtain at least one entity phrase; and
   applying the CQG neural network model to generate a clarification question with an enhanced recall rate and consistency for a fuzzy question based on the clarification question template and the at least one entity phrase for presenting to the user; wherein
   the clarification question comprises irrelevant words, and the irrelevant words are eliminated from the clarification question via the pointer generator mechanism, resulting in the enhanced recall rate and consistency, and the CQG neural network model is trained with a collaborative training paradigm, which combines an auxiliary task based on self-supervised learning with a downstream CQG task for end-to-end training.

2. The method according to claim 1, wherein the template generating module comprises a template generating encoder and a template generating decoder;

the template generating encoder comprises a first layered Transformer encoder layer;

the template generating decoder comprises a first layered Transformer decoder layer and a first pointer generator; and inputting the fuzzy context into the template generating module so as to obtain the clarification question template comprises: forming a first word embedding with a predetermined length and a predetermined dimension based on the fuzzy context;

converting, the first layered Transformer encoder layer, the first word embedding into a first layered context representation; and generating the clarification question template based on the first layered context representation by the first layered Transformer decoder layer and the first pointer generator.

3. The method according to claim 2, wherein generating the clarification question template by the first layered Transformer decoder layer and the first pointer generator comprises:

generating a first predictive output representation based on the first layered context representation and calculating a first probability of generating words from a preset vocabulary by using a softmax function according to the first predictive output representation, by the first layered Transformer decoder layer;

taking the first pointer generator as a first soft switch to select to copy the first word from the fuzzy context according to an attention distribution output by a last decoder layer in the first layered Transformer decoder layer, or to generate a second word from the vocabulary according to the first final probability obtained from the first probability; and generating the clarification question template based on the first word and/or the second word.

4. The method according to claim 3, wherein the entity rendering module comprises an entity rendering encoder and an entity rendering decoder;

the entity rendering encoder comprises a second layered Transformer encoder layer;

the entity rendering decoder comprises a second layered Transformer decoder layer and a second pointer generator;

inputting the entity information into the entity rendering module so as to obtain the at least one entity phrase comprises:

forming a second word embedding with the predetermined length and the predetermined dimension based on the entity information;

converting, by the second layered Transformer encoder layer, the second word embedding into a second layered context representation; and generating the at least one entity phrase based on the second layered context representation by the second layered Transformer decoder layer and the second pointer generator.

5. The method according to claim 4, wherein generating the at least one entity phrase by the second layered Transformer decoder layer and the second pointer generator comprises:

generating a second predictive output representation based on the second layered context representation and calculating a second probability of generating words from the vocabulary by using a softmaxfunction according to the second predictive output representation, by the second layered Transformer decoder layer;

taking the second pointer generator as a second soft switch to select to copy the third word from the entity information according to an attention distribution output by a last decoder layer in the second layered Transformer decoder layer, or to generate a forth word from the vocabulary according to the second final probability obtained from the second probability; and generating the at least one entity phrase based on the third word and/or the fourth word.

6. The method according to claim 5, wherein training instances are randomly sampled from a mixed training set of the auxiliary task based on self-supervised learning and the downstream CQG task to input to the CQG neural network model to train for a minimum total loss.

7. The method according to claim 6, wherein the fuzzy context comprises a historical question, a historical answer and a fuzzy question; the entity information comprises an entity name, an entity type and an entity description;

the auxiliary task based on self-supervised learning comprises a dialogue history prediction auxiliary task and an entity name prediction auxiliary task;

a dialog history template is generated by screening the entity name according to the fuzzy question in the dialog history prediction auxiliary task;

at least one predicted entity name is generated according to the entity type and the entity description in the entity name prediction auxiliary task; and in the dialog history prediction auxiliary task, a predicted history question and a predicted history question answer are generated according to the dialog history template and the prediction entity name, and finally a dialog history is generated according to the predicted history and the predicted history answer.

8. An electronic device, comprising a memory, a processor and a computer program stored on the memory and executable on the processor, wherein the processor implements the method of claim 1 when executing the computer program.

9. The electronic device of claim 8, wherein the template generating module comprises a template generating encoder and a template generating decoder;

the template generating encoder comprises a first layered Transformer encoder layer;

the template generating decoder comprises a first layered Transformer decoder layer and a first pointer generator; and inputting the fuzzy context into the template generating module so as to obtain the clarification question template comprises: forming a first word embedding with a predetermined length and a predetermined dimension based on the fuzzy context;

converting, the first layered Transformer encoder layer, the first word embedding into a first layered context representation; and generating the clarification question template based on the first layered context representation by the first layered Transformer decoder layer and the first pointer generator.

10. The electronic device of claim 9, wherein generating the clarification question template by the first layered Transformer decoder layer and the first pointer generator comprises:

generating a first predictive output representation based on the first layered context representation and calculating a first probability of generating words from a preset vocabulary by using a softmax function according to the first predictive output representation, by the first layered Transformer decoder layer;

taking the first pointer generator as a first soft switch to select to copy the first word from the fuzzy context according to an attention distribution output by a last decoder layer in the first layered Transformer decoder layer, or to generate a second word from the vocabulary according to the first final probability obtained from the first probability; and generating the clarification question template based on the first word and/or the second word.

11. The electronic device of claim 10, wherein the entity rendering module comprises an entity rendering encoder and an entity rendering decoder;

the entity rendering encoder comprises a second layered Transformer encoder layer;

the entity rendering decoder comprises a second layered Transformer decoder layer and a second pointer generator;

inputting the entity information into the entity rendering module so as to obtain the at least one entity phrase comprises:

forming a second word embedding with the predetermined length and the predetermined dimension based on the entity information;

converting, by the second layered Transformer encoder layer, the second word embedding into a second layered context representation; and generating the at least one entity phrase based on the second layered context representation by the second layered Transformer decoder layer and the second pointer generator.

12. The electronic device of claim 11, wherein generating the at least one entity phrase by the second layered Transformer decoder layer and the second pointer generator comprises:

generating a second predictive output representation based on the second layered context representation and calculating a second probability of generating words from the vocabulary by using a softmaxfunction according to the second predictive output representation, by the second layered Transformer decoder layer;

taking the second pointer generator as a second soft switch to select to copy the third word from the entity information according to an attention distribution output by a last decoder layer in the second layered Transformer decoder layer, or to generate a forth word from the vocabulary according to the second final probability obtained from the second probability; and generating the at least one entity phrase based on the third word and/or the fourth word.

13. The electronic device of claim 12, wherein training instances are randomly sampled from a mixed training set of the auxiliary task based on self-supervised learning and the downstream CQG task to input to the CQG neural network model to train for a minimum total loss.

14. The electronic device of claim 13, wherein the fuzzy context comprises a historical question, a historical answer and a fuzzy question; the entity information comprises an entity name, an entity type and an entity description;

the auxiliary task based on self-supervised learning comprises a dialogue history prediction auxiliary task and an entity name prediction auxiliary task;

a dialog history template is generated by screening the entity name according to the fuzzy question in the dialog history prediction auxiliary task;

at least one predicted entity name is generated according to the entity type and the entity description in the entity name prediction auxiliary task; and in the dialog history prediction auxiliary task, a predicted history question and a predicted history question answer are generated according to the dialog history template and the prediction entity name, and finally a dialog history is generated according to the predicted history and the predicted history answer.

15. A device for clarification question generation, comprising:

an entity information extraction module configured to extract entity information from a fuzzy context in response to receiving the fuzzy context including historical questions, historical answers and fuzzy questions input by a user via an input/output interface;

a construction module configured to generate a Clarification Question Generation (CQG) neural network model by adding a layered Transformer mechanism and a pointer generator mechanism into a coarse-to-fine model;

a clarification question template generating module configured to input the fuzzy context into a template generating module of the CQG neural network model so as to obtain a clarification question template;

an entity phrase generation module configured to input the entity information into an entity rendering module of the CQG neural network model so as to obtain at least one entity phrase; and a clarification question generation module configured to apply the CQG neural network model to generate a clarification question with an enhanced recall rate and consistency for a fuzzy question based on the clarification question template and the at least one entity phrase for presenting to the user, wherein the clarification question comprises irrelevant words, and the irrelevant words are eliminated from the clarification question via the pointer generator mechanism, resulting in the enhanced recall rate and consistency, and the CQG neural network model is trained with a collaborative training paradigm, which combines an auxiliary task based on self-supervised learning with a downstream CQG task for end-to-end training.

* * * * *